United States Patent
Lienhart et al.

(10) Patent No.: US 7,702,941 B2
(45) Date of Patent: Apr. 20, 2010

(54) UNIVERSAL ADAPTIVE SYNCHRONIZATION SCHEME FOR DISTRIBUTED AUDIO-VIDEO CAPTURE ON HETEROGENEOUS COMPUTING PLATFORMS

(75) Inventors: Rainer W. Lienhart, Santa Clara, CA (US); Igor V. Kozintsev, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1802 days.

(21) Appl. No.: 10/640,108

(22) Filed: Aug. 13, 2003

(65) Prior Publication Data

US 2005/0039215 A1   Feb. 17, 2005

(51) Int. Cl.
*H03M 3/00*   (2006.01)
*G06F 1/12*   (2006.01)

(52) U.S. Cl. .......................... 713/400; 713/401; 716/6; 375/355; 375/371; 341/143; 341/144; 341/155

(58) Field of Classification Search ................ 713/400, 713/401; 716/6; 375/355, 371; 341/143, 341/144, 155
See application file for complete search history.

(56) References Cited

U.S. PATENT DOCUMENTS

| | | | |
|---|---|---|---|
| 6,512,473 B2 * | 1/2003 | Sasaki | 341/159 |
| 7,408,683 B2 * | 8/2008 | Sato et al. | 358/474 |
| 2002/0106043 A1 * | 8/2002 | Sasaki | 375/355 |
| 2002/0114354 A1 | 8/2002 | Sinha et al. | |
| 2003/0086515 A1 | 5/2003 | Trans et al. | |
| 2004/0032628 A1 * | 2/2004 | Sato et al. | 358/514 |

FOREIGN PATENT DOCUMENTS

| | | |
|---|---|---|
| JP | 08-200707 | 2/1998 |
| WO | WO 01/19005 A1 | 3/2001 |
| WO | WO 02/30021 A2 | 4/2002 |

OTHER PUBLICATIONS

PCT Search Report, PCT/US2004/025475, Dec. 27, 2004, 6 pages.
PCT Written Opinion, PCT/US2004/025475, Dec. 27, 2004, 5 pages.

* cited by examiner

*Primary Examiner*—Abdelmoniem Elamin
(74) *Attorney, Agent, or Firm*—Blakely, Sokoloff, Taylor & Zafman LLP

(57) ABSTRACT

According to one embodiment of the present invention, a novel apparatus is disclosed. The apparatus includes an analog to digital converter to receive a predefined synchronization signal and a receiver clock; and an interpolation module coupled to the analog to digital converter to receive an output of the analog to digital converter and to continuously estimate and adapt current delay and skew estimates to synchronize a signal.

30 Claims, 7 Drawing Sheets

UNIVERSAL ADAPTIVE SYNCHRONIZATION SCHEME FOR DISTRIBUTED AUDIO-VIDEO CAPTURE ON HETEROGENEOUS COMPUTING PLATFORMS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

1. Field of the Invention

The present invention generally relates to the field of distributed multimedia synchronization. More particularly, an embodiment of the present invention relates to a universal adaptive synchronization scheme for distributed audio-video capture on heterogeneous computing platforms.

2. Background

One approach to provide additional computing power has been to utilize distributed computer environments. This approach enables several computers to collaboratively perform computational tasks within a reduced amount of time. Generally, the divide and conquer approach provided by such parallel computing approaches enables utilization of available personal computers, rather than purchasing of a high performance, server-based computer system for performing the computationally intensive tasks.

Distributed computing has generally, however, been applied to performing purely computational tasks and not to synchronized capture and/or processing of signals, especially audio/video signals (and data streams). Signal processing of audio/video signals (and data streams) are generally very sensitive to even very small differences in sampling rates (e.g., clock skew), jitter, and delays. Therefore, precise synchronization is very critical for high quality input/output processing, as well as for real-time performance and in general, robustness and reliability issues. But, precise capture and synchronized inputs are not guaranteed on current platforms.

For example, on the same personal computer (PC) platform, problems can arise when several input/output (I/O) devices are used to capture audio and visual information from video camera(s) and microphone(s). Due to the fact that the different I/O devices will be triggered by separate oscillators, resulting audio samples and video frames will not be aligned on an absolute time line (thus inducing some relative offsets). Moreover, due to differences in the oscillators' frequencies, audio and/or visual data will drift away across multiple channels/streams over time. Instabilities in the oscillators' frequencies will also not be perfectly correlated between each other.

Similarly, in the case of multiple PC platforms audio and visual I/O devices will not be synchronized in time scale inducing some relative offsets and data samples to drift relative to each other. The extent of the relative offset, drift, and jitter on the existing platforms depends on many hardware and software parameters and can be very significant, sometimes causing total degradation of the processed signals (from the non-synchronized input streams). Such drifts, delays, and jitters can cause significant performance degradation for instance for array signal processing algorithms.

For example, in an acoustic beam former with 10 centimeter (cm) spacing between microphones, an error of only 0.01 percent in time can cause error of 20 degrees in the beam direction. Due to this fact, current implementations of audio array process algorithms may rely on dedicated circuitry for the synchronization between multiple I/O channels. Unfortunately, implementing such an approach with existing PC platforms would require a major overhaul of the current hardware utilized by the PC platforms. Therefore, there remains a need to overcome one or more of the limitations in the above-described existing art.

BRIEF DESCRIPTION OF THE DRAWINGS

The invention is illustrated by way of example and not limitation in the figures of the accompanying drawings, in which like references indicate similar or identical elements, and in which.

DETAILED DESCRIPTION

In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The following clock-related definitions are used herein:

"stability" denotes how well a clock can maintain a constant frequency;

"accuracy" denotes how well a clock's time compares to national standards;

"precision" specifies the internal resolution of the clock;

"offset" specifies the time difference between two clocks;

"skew" characterizes the difference in frequency between two clocks and is defined as the ratio of the frequencies;

"synchronizing two clocks" denotes the process of reconciling two clocks with respect to frequency and time (i.e., correcting the offset to zero and making the skew equal to one).

Also, the use of the term general purpose computer (GPC) herein is intended to denote laptops, PDAs, tablet PCs, mobile phones, and similar devices that can be a part of a distributed audio/visual system.

Figure 1:
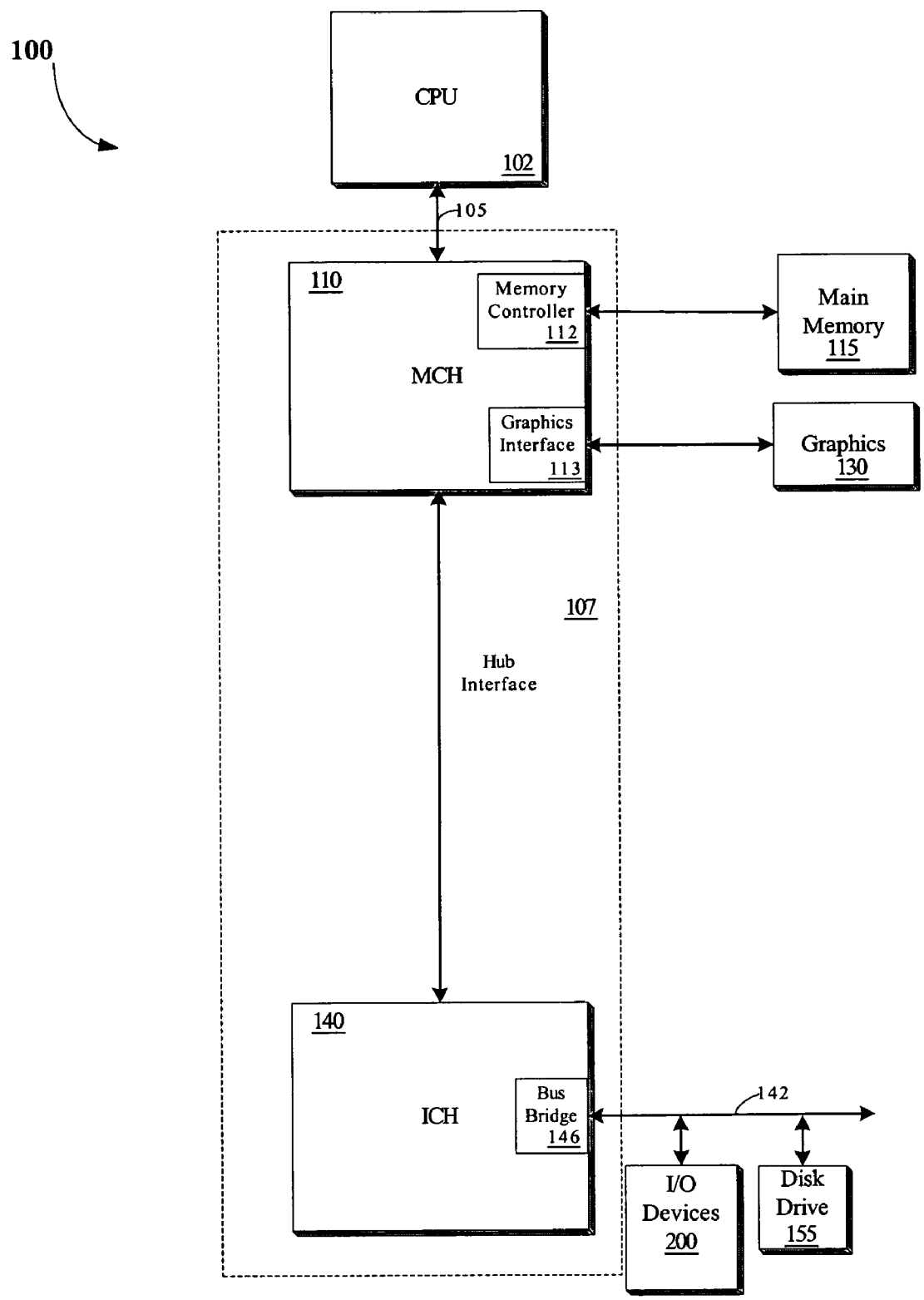
FIG. 1 illustrates an exemplary block diagram of a computer system 100 in which one embodiment of the present invention may be implemented.

FIG. 1 illustrates an exemplary block diagram of a computer system 100 in which one embodiment of the present invention may be implemented. The computer system 100 includes a central processing unit (CPU) 102 coupled to a bus 105. In one embodiment, the CPU 102 is a processor in the Pentium® family of processors including the Pentium® II processor family, Pentium® III processors, Pentium® IV processors available from Intel Corporation of Santa Clara, Calif. Alternatively, other CPUs may be used, such as Intel's XScale processor, Intel's Pentium M Processors, ARM processors available from ARM Ltd. of Cambridge, the United Kingdom, or OMAP processor (an enhanced ARM-based processor) available from Texas Instruments, Inc., of Dallas, Tex.

A chipset 107 is also coupled to the bus 105. The chipset 107 includes a memory control hub (MCH) 110. The MCH 110 may include a memory controller 112 that is coupled to a main system memory 115. Main system memory 115 stores data and sequences of instructions that are executed by the CPU 102 or any other device included in the system 100. In one embodiment, main system memory 115 includes dynamic random access memory (DRAM); however, main system memory 115 may be implemented using other memory types. Additional devices may also be coupled to the bus 105, such as multiple CPUs and/or multiple system memories.

The MCH 110 may also include a graphics interface 113 coupled to a graphics accelerator 130. In one embodiment, graphics interface 113 is coupled to graphics accelerator 130 via an accelerated graphics port (AGP) that operates according to an AGP Specification Revision 2.0 interface developed by Intel Corporation of Santa Clara, Calif. In an embodiment of the present invention, a flat panel display may be coupled to the graphics interface 113 through, for example, a signal converter that translates a digital representation of an image stored in a storage device such as video memory or system memory into display signals that are interpreted and displayed by the flat-panel screen. It is envisioned that the display signals produced by the display device may pass through various control devices before being interpreted by and subsequently displayed on the flat-panel display monitor. The display device may be an liquid crystal display (LCD), a flat panel display, a plasma screen, a thin film transistor (TFT) display, and the like.

In addition, the hub interface couples the MCH 110 to an input/output control hub (ICH) 140 via a hub interface. The ICH 140 provides an interface to input/output (I/O) devices within the computer system 100. In one embodiment of the present invention, the ICH 140 may be coupled to a Peripheral Component Interconnect (PCI) bus adhering to a Specification Revision 2.1 bus developed by the PCI Special Interest Group of Portland, Oreg. Thus, the ICH 140 includes a bus bridge 146 that provides an interface to a bus 142. In one embodiment of the present invention, the bus 142 is a PCI bus. Moreover, the bus bridge 146 provides a data path between the CPU 102 and peripheral devices.

The bus 142 includes I/O devices 200 (which are further discussed with reference to FIG. 2) and a disk drive 155. However, one of ordinary skill in the art will appreciate that other devices may be coupled to the PCI bus 142. In addition, one of ordinary skill in the art will recognize that the CPU 102 and MCH 110 may be combined to form a single chip. Furthermore, graphics accelerator 130 may be included within MCH 110 in other embodiments.

In addition, other peripherals may also be coupled to the ICH 140 in various embodiments of the present invention. For example, such peripherals may include integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Moreover, the computer system 100 is envisioned to receive electrical power from one or more of the following sources for its operation: a power source (such as a battery, fuel cell, and the like), alternating current (AC) outlet (e.g., through a transformer and/or adaptor), automotive power supplies, airplane power supplies, and the like.

Figure 2:
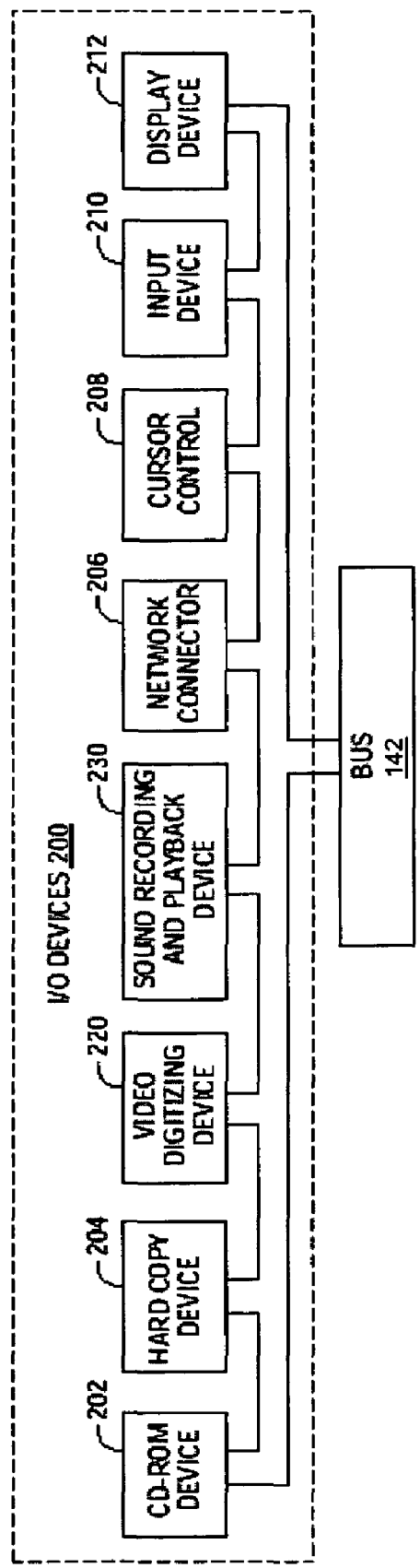
FIG. 2 further illustrates the I/O devices 200 of the computer system 100 as depicted in FIG. 1.

FIG. 2 further illustrates I/O devices 200 of the computer system 100 as depicted in FIG. 1. As illustrated, the computer system 100 may include a display device 212 such as a monitor. The display device 212 may include an intermediate device such as a frame buffer. The computer system 100 also includes an input device 210 such as a keyboard and a cursor control 208 such as a mouse, trackball, or track pad. The display device 212, the input device 210, and the cursor control 208 are coupled to bus 142. The computer system 100 may include a network connector 206 so that computer system 100 may be connected as part as a local area network (LAN) or a wide area network (WAN) such as, for example, the Internet.

Additionally, the computer system 100 can also be coupled to a device for sound recording and playback 230 such as an audio digitization device coupled to a microphone for recording voice input for speech recognition or for recording sound in general. The I/O devices 200 of computer system 100 may also include a video digitizing device 220 that can be used to capture video images alone or in conjunction with sound recording device 230 to capture audio information associated with the video images. Furthermore, the input devices 200 may also include a hard copy device 204 (such as a printer) and a CD-ROM device 202. The input devices 200 (202-212) are also coupled to bus 142.

Accordingly, the computer system 100 as depicted in FIG. 1 may be utilized to capture multimedia data including, for example, audio and/or video data from a selected scene, environment, or the like. Currently, many individuals utilize personal computers (PCs) such as depicted in FIG. 1 in order to capture live audio/video data (multimedia scene data) through, for example, a camera coupled to a port of computer system 100 (not shown) such as, for example, a USB port or a firewire port (IEEE 1394). This data is then provided as a streaming media format (Multimedia Stream Data) including, but not limited to, Microsoft® advanced steaming format (ASF) files, motion picture experts group (MPEG) standards such as MPEG-1/2/4, and audio layer-3 (MP3) files, Real Audio G2 files, QDesign2 files, or the like.

In one embodiment of the present invention, an audio capture device such as a microphone may be utilized by the computer system 100 to capture audio information associated with the captured multimedia scene data. Accordingly, as individuals attempt to utilize their personal computers in order to capture, for example, live audio/video data, it is generally recognized that audio/video data is most effectively captured utilizing one or more data capture devices.

With reference to FIGS. 1 and 2, the I/O devices (except AGP display adapters) are generally connected to the ICH (I/O hub) via dedicated or shared buses. The PCI bus can be a way to connect various audio, video, and networking devices to the ICH. These devices typically have their own crystal oscillators and clocks that are not synchronized to each other, and to the CPU clock. This means, for example, that if audio and video samples are captured using separate I/O cards, they can go out of sync as time passes by.

Unfortunately, the time it takes for a block of data to travel between I/O device, main memory, and CPU is variable and depends on many factors like the CPU load, cache state, activity of other I/O devices that share the bus, and the operating system behavior. Therefore, applications that process data have no way to know precisely the time the data enters or leaves the I/O devices. The propagation delay may range from nanoseconds to milliseconds depending on the conditions mentioned above.

In existing applications, multiple video and audio streams are usually captured using a single I/O device such as a multi-channel analog to digital (A/D) or audio/video (A/V) capture cards. Special methods are needed to use multiple I/O devices synchronously even on a single PC platform.

The situation becomes more complex when synchronization of I/O devices on separate platforms is desired. There, in addition to I/O-CPU latencies, network connection introduces additional delays, that are variable due to best-effort (and therefore variable transmission delay) type of Media Access Protocols used in existing wired and wireless Ethernet.

Figure 3:
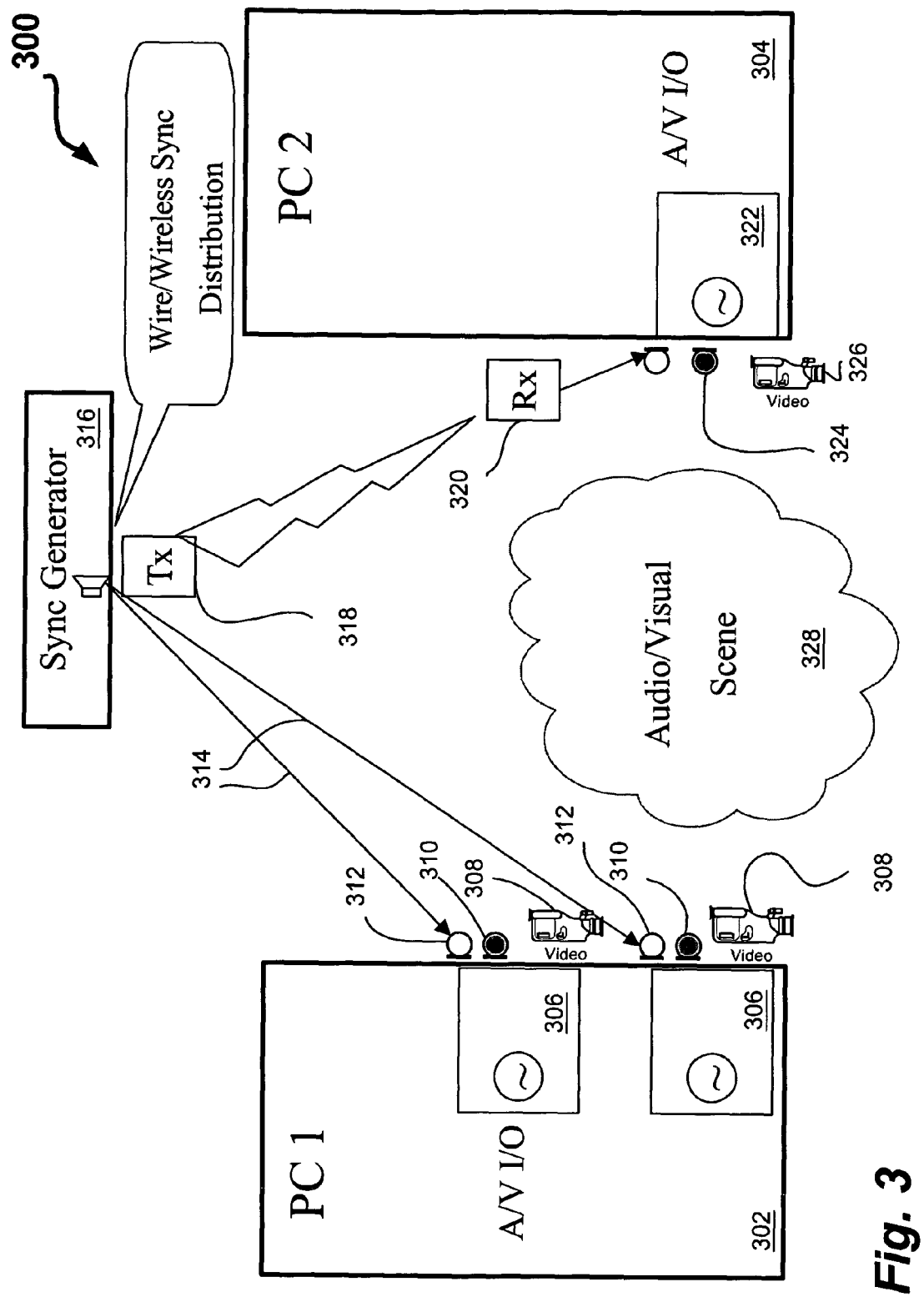
FIG. 3 illustrates an exemplary synchronized, distributed multimedia data capture system 300 which may be utilized to implement an embodiment of the present invention.

FIG. 3 illustrates an exemplary synchronized, distributed multimedia data capture system 300 which may be utilized to implement an embodiment of the present invention. As illustrated in FIG. 3, the data capture system 300 may include a plurality of multimedia platforms (302 and 304). However, FIG. 3 should not be construed in a limiting sense and is provided to illustration one embodiment of the present invention.

The multimedia platform 302, as well as multimedia platform 304 may be provided utilizing the computer system 100, as depicted in FIG. 1. As illustrated, the multimedia platform 302 includes a plurality of I/O cards 306 which may include a microphone 310, as well as a video capture device 308. Each audio/video card may include a wired link input 312, which is used to receive a multimedia synchronization signal 314, which is generated by sync generator 316.

In on embodiment of the present invention, the sync generator 316 is configured utilizing a computer system, such as the computer system 100, as depicted in FIG. 1. The sync generator 316 may generate the synchronization signal 314. In one embodiment of the present invention, the synchronization signal 314 is selected as a maximum length sequences (MLS) signal, which is generally comprised of white noise, to form an audio sync signal. Sequence numbers may be modulated onto the MLS signal. However, in alternate embodiments, a different multimedia synchronization signal may be selected if desired based on the specific implementation.

The synchronization signal 314 may be provided via a wired link, for example, to multimedia platform 302 and/or may be transmitted wirelessly via a transmitter 318 and a receiver 320 to multimedia platform 304. An example of the wireless transmitter 318 and receiver 320 is a radio frequency (RF) based transmitter and receiver. In one embodiment of the present invention, a single multimedia synchronization signal is generated which is transmitted to each of the multimedia platforms via either a wired link or a wireless link. As such, the multimedia platform 304 includes an I/O card 322 with a video capture device 326, as well as an audio capture device 324.

Furthermore, in contrast to the multimedia platform 302, the multimedia platform 304 may include the wireless receiver (Rx) 320, which may be used to capture the received multimedia synchronization signal. In one embodiment of the present invention, the transmitter 318 modulates the synchronization signal 314 onto a multimedia signal (e.g., audio signal), which in turn is modulated onto some wireless carrier signal and the receiver 320 demodulates the received signal in order to generate the multimedia modulated synchronization signal used by the platform 304. The multimedia modulated synchronization signal (i.e., the synchronization signal modulated onto a multimedia signal) is then provided to the video capture device(s) and/or audio capture device(s) in order to enable synchronization of captured audio/visual scene data 328. In an embodiment of the present invention, the wireless transmission of the synchronization signal may be provided using, for example, wireless audio transmission via a U.S. Robotics Sound Link Solution.

In accordance with one embodiment of the present invention, an audio synchronization signal is generated as the multimedia synchronization signal. In one embodiment of the present invention, the sync generator 316 produces special synchronization signals and modulates them using its own clock information. The synchronization signals are delivered to audio input devices using wired (as to 302) or wireless (as to 304) mechanism to a dedicated synchronization audio channel. As a result, the synchronization information becomes embedded in the audio/video streams as a separate audio track and is available to the application layer for the processing.

In accordance with an embodiment of the present invention, once errors are determined within generated multimedia stream data, each multimedia platform (e.g., 302 or 304) is responsible, for example, for resampling of generated multimedia stream data to synchronize the multimedia stream data generated by each I/O card of each multimedia platform. Consequently, once all generated multimedia stream data is synchronized, the captured stream data may be provided to an array signal-processing computer (not illustrated). The array signal processing computer may then perform, for example, beam forming, blind signal separation (BSS), multi-modal recognition, or the like, utilizing the synchronized multimedia stream data. Likewise, embodiments of the present invention may be performed within the multimedia data capture system 300 using, for example, camcorders, video capture devices, or the like, which may include multiple input channels.

Figure 4A:
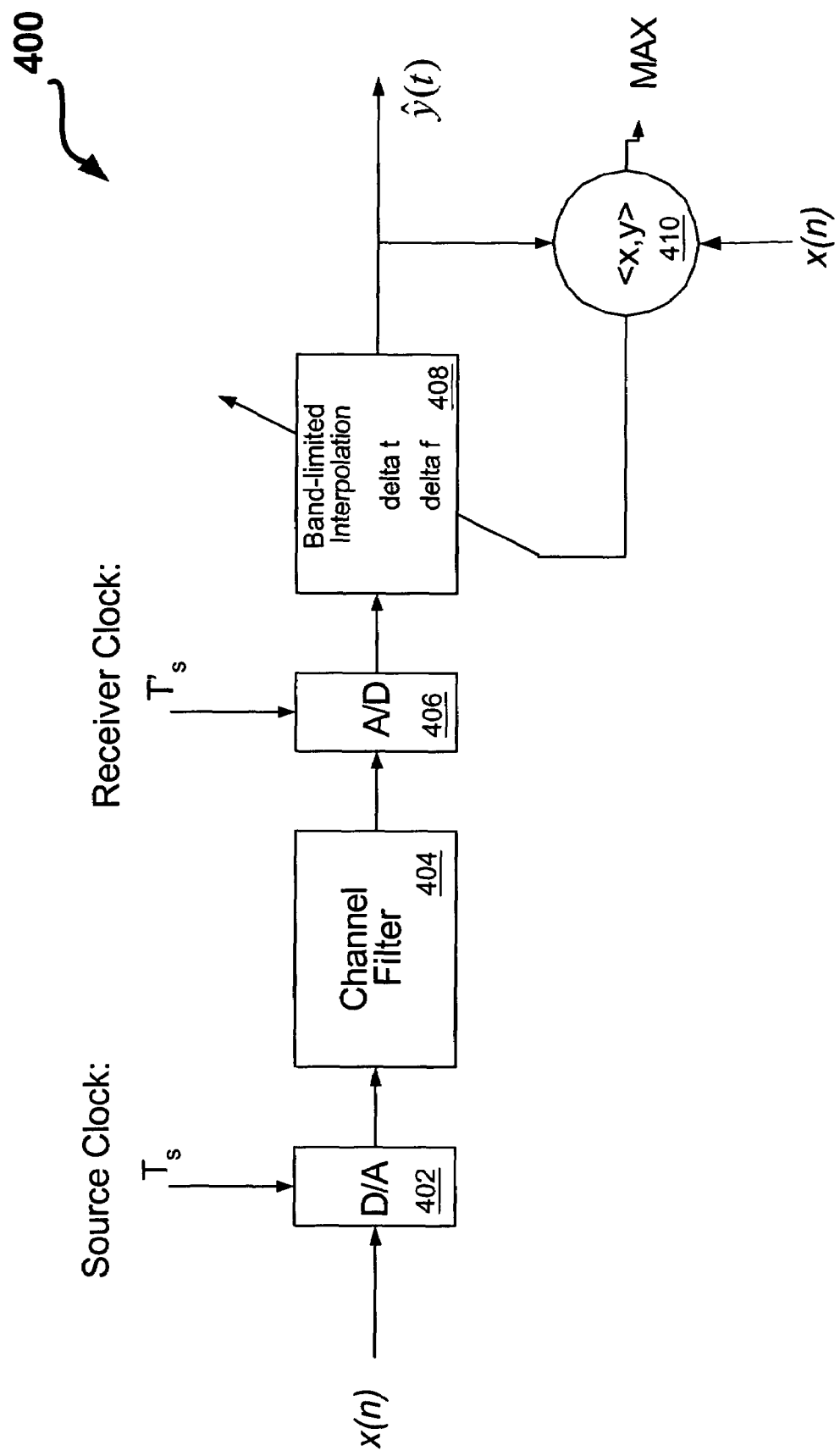
FIGS. 4A and 4B illustrate exemplary adaptive filtering systems 400 and 450 in accordance with embodiments of the present invention.

FIG. 4A illustrates an exemplary adaptive filtering system 400 in accordance with an embodiment of the present invention. In one embodiment of the present invention, the system 400 operates by utilizing band-limited signal interpolation to continuously estimate and adapt current delay and skew estimates to synchronize audio/visual signals collected from multiple devices. In an embodiment of the present invention, the system 400 of FIG. 4A may be embedded on a computer system (such as the computer system 100 of FIG. 1), a digital signal processor (DSP), a coder-decoder (codec) module, a CPU, and the like.

The system 400 includes a Digital to Analog (D/A) converter 402 which receives a source synchronization signal x(n) from a sender (clock master) and a source clock $T_s$. The digital to analog converter 402 may be provided at a sender location. The source synchronization signal may be a multimedia signal such as an audio or video signal. The D/A converter 402 then provides its output to a channel filter 404. It is envisioned that the channel filter 404 exemplifies characteristics of the signal transmission environment or medium coupling the sender and receivers (e.g., a copper wire, RF medium, frequency modulation (FM) medium, other wireless medium, and the like).

The system 400 further includes an analog to digital (A/D) converter 406 (e.g., at a receiver location), which converts the signal transmitted through the channel filter 404 into digital form. The A/D converter 406 further receives a receiver clock $T_s'$ to sample the signal transmitted through the channel filter 404. In one embodiment of the present invention, the source clock may be used for the actual sample rate of the D/A converter 402, while the sync signal x(n) would be the signal that is used to determine the difference in the sample rate between the master D/A 402 and the client A/D converter(s) 406. In an embodiment of the present invention, the source clock $T_s$ and the receiver clock $T_s'$ are provided by a device such as a DSP, a codec module, a CPU, and the like.

As illustrated in FIG. 4A, the A/D converter 406 is coupled to a band-limited interpolation module 408, which is driven by maximizing some cost function between the source synchronization signal x(n) and the resampled output of the A/D converter 406 to generate the output signal of the system 400 (ŷ(t)) and to determine the skew (delta_f) and offset (delta_t) values. In one embodiment of the present invention, all multimedia signal captured by some A/D converter driven with the same clock as 406 are re-sampled accordingly The precise form of the synchronization signal may be a domain knowledge and thus known at the sender as well as all receivers. The estimation of the time delay and sampling skew between the actually recorded signal y(n$T_s'$) at a receiver with a sampling rate of $F_s'=1/T_s'$ and the source signal x(n$T_s$) operating at sampling rate $F_s=1/T_s$ is based on the adaptive filtering approach shown in FIG. 4A. At the sender the sync signal x(n$T_s$) is sent out through the D/A converter 402 at sampling rate $F_s$. The signal is assumed to go through a filter formed by the D/A converter, transmission channel (e.g., wireless channel), and finally A/D converter with a sample rate of $F_s'$ on the receiving side.

An adaptive filter based on band-limited interpolation of discrete-time signals (408) is then used to estimate offset Δt and the skew $\Delta F=T_s'/T_s''$. The band-limited interpolated signal ŷ(t) with estimated offset Δt and sampling period $T_s''$ is given by:

$$\hat{y}(t) = \sum_{n=-\infty}^{\infty} y(nT_s') \cdot a \cdot \text{sinc}(b(t - nT_s'))$$

$$\hat{y}(t') = a \sum_{n=-\infty}^{\infty} y(nT_s') \cdot \frac{\sin(\tilde{t} - \tilde{b}n)}{\tilde{t} - \tilde{b}n}$$

where $$a = \min\left\{1, \frac{F_s''}{F_s'}\right\}, \tilde{b} = \pi T_s' \min\{F_s', F_s''\}, \tilde{t} = bt\pi$$

In an embodiment of the present invention, for simplicity, the windowing function used in the implementation (e.g., Kaiser window) is omitted in this formulation. Given the inner product as the performance criterion over a time window of size w, the optimization criterion becomes:

$$f(T_s'', \Delta t) = \langle x(nT_s), \hat{y}(t) \rangle \rightarrow \max$$

where t is evaluated at $t=nT_s''+\Delta t$. Gradient decent can be applied for optimization in accordance with an embodiment of the present invention.

Although the adaptive time delay and sampling skew estimator of FIG. 4A can track fractional time delay and fractional sampling skew, it may be initialized by rough estimates for the time delay Δt and sampling skew factor $\Delta F=T_s'/T_s''$ in one embodiment of the present invention.

In an embodiment of the present invention, to improve the precision of the MLS time offset estimation, two or more audio samples per MLS symbol may be utilized. Accordingly, there is going to be more than two samples per main lobe of MLS autocorrelation function and the precision of finding the position of the autocorrelation peak increases. The position may be found by fitting a curve (or its approximation) corresponding to the autocorrelation main lobe to the samples with highest values.

In an embodiment of the present invention, a novel method to initialize the skew estimate of the adaptive filter approach based on 'Autonomous Estimation of Skew' (self-monitoring/self-sensing) is disclosed. As an alternative to (or in addition to) the MLS-based skew estimation, networking services may be utilized to calibrate individual audio clocks by running a dummy audio capture process counting the number of samples observed per measurement period. In one embodiment of the present invention, it is assumed that the current platform has a reasonable long-term sampling clock stability and that the Network Time Protocol (NTP) is providing a system clock with a clock error per day (CEPD) of hundreds of milliseconds, where:

T: Observation period (in seconds)

ΔT: Uncertainty in observation interval (in seconds)

$f^{target}$: Target sampling rate (in Hertz)

$f^{actual}$: Actual sampling rate (in Hertz)

$S^{target}$: Number of samples produced in observation period T at sample rate $f^{target}$ $S^{actual}$: Number of samples produced in observation period T at sample rate $f^{actual}$ $S^{measured}$: Number of samples produced in observation period T±ΔT at sample rate $f^{actual}$ Assuming an accurate system clock at each distributed platform, the skew between the target sampling rate and actual sampling rate of a platform may be determined as follows:

$$\text{skew} = \frac{f^{target}}{f^{actual}} = \frac{T \cdot f^{target}}{T \cdot f^{actual}} = \frac{S^{target}}{S^{actual}}$$

In real world, however, the system clock may not be perfect or accurate enough. Given an uncertainty of ΔT for an observation period of T, the measured skew may be determined as follows"

$$\text{skew}^{measured} = \frac{S^{target}}{S^{measured}} = \frac{T \cdot f^{target}}{(T \pm \Delta T) \cdot f^{actual}} = \frac{T}{(T \pm \Delta T)} \text{skew}$$

$$\Leftrightarrow \text{skew} = \left(1 \pm \frac{\Delta T}{T}\right) \cdot \text{skew}^{measured}$$

In other words, the error in the estimated skew factor is 1±ΔT/T. Given a clock accuracy of NTP of around 250 ms and an observation period of 1 day, the estimation error is less than $3 \cdot 10^{-6}$. Thus, a sample rate around 44.1 kHz may be correctly determined up to 0.13 samples per second.

Figure 4B:
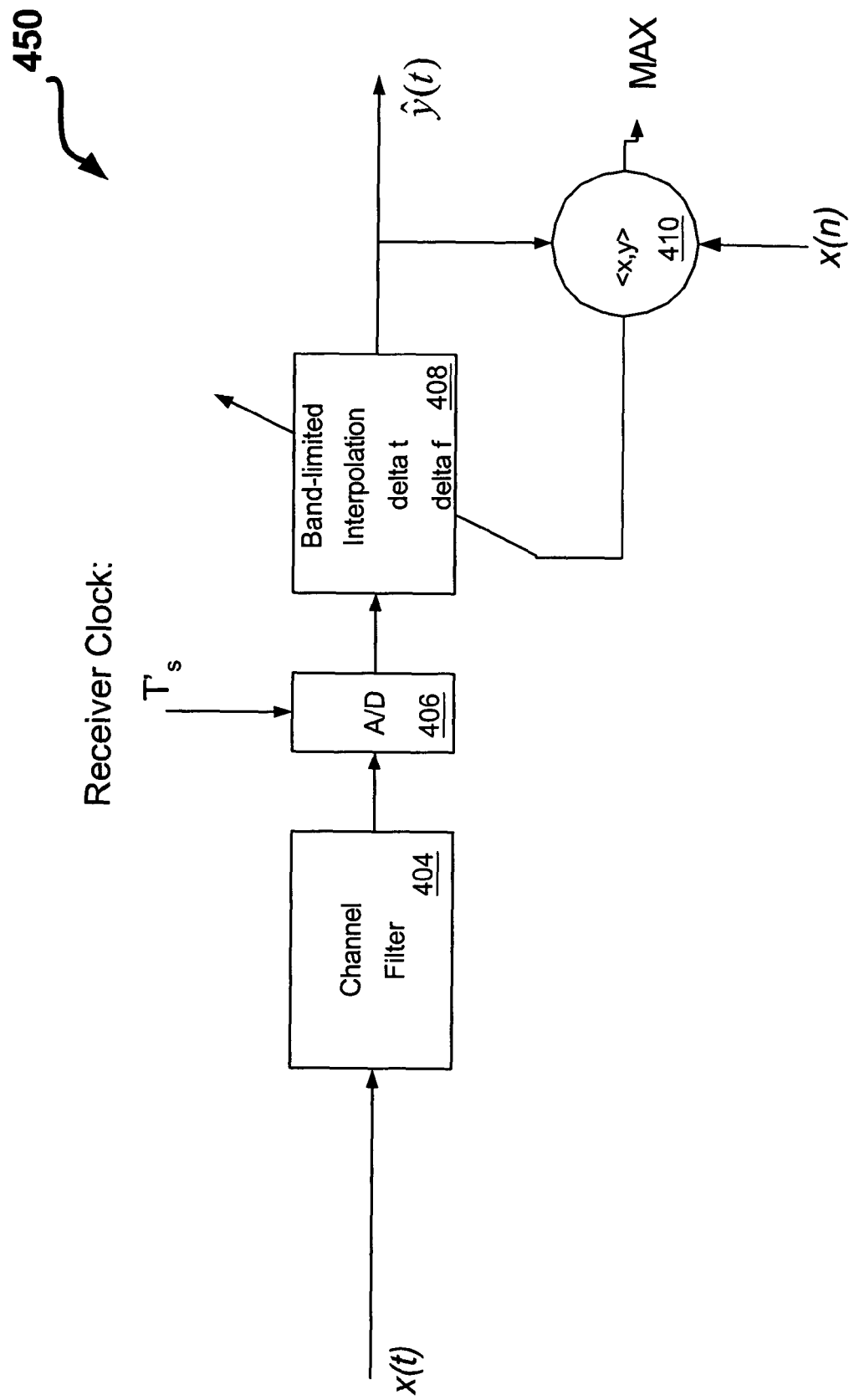

FIG. 4B illustrates an exemplary adaptive filtering system 450 in accordance with an embodiment of the present invention. In one embodiment of the present invention, the system 450 includes the channel filter 404, the A/D converter 406, the band-limited interpolation module 408, and the scalar product 410. As illustrated in FIG. 4B, the analog synch signal x(t) (where x(n) denotes the digital synch signal, while x(t) denotes the continuous analog signal) may be generated in the analog domain. It is also envisioned that the digital reference form x(n) of x(t) may be known in an embodiment of the present invention.

Figure 5:
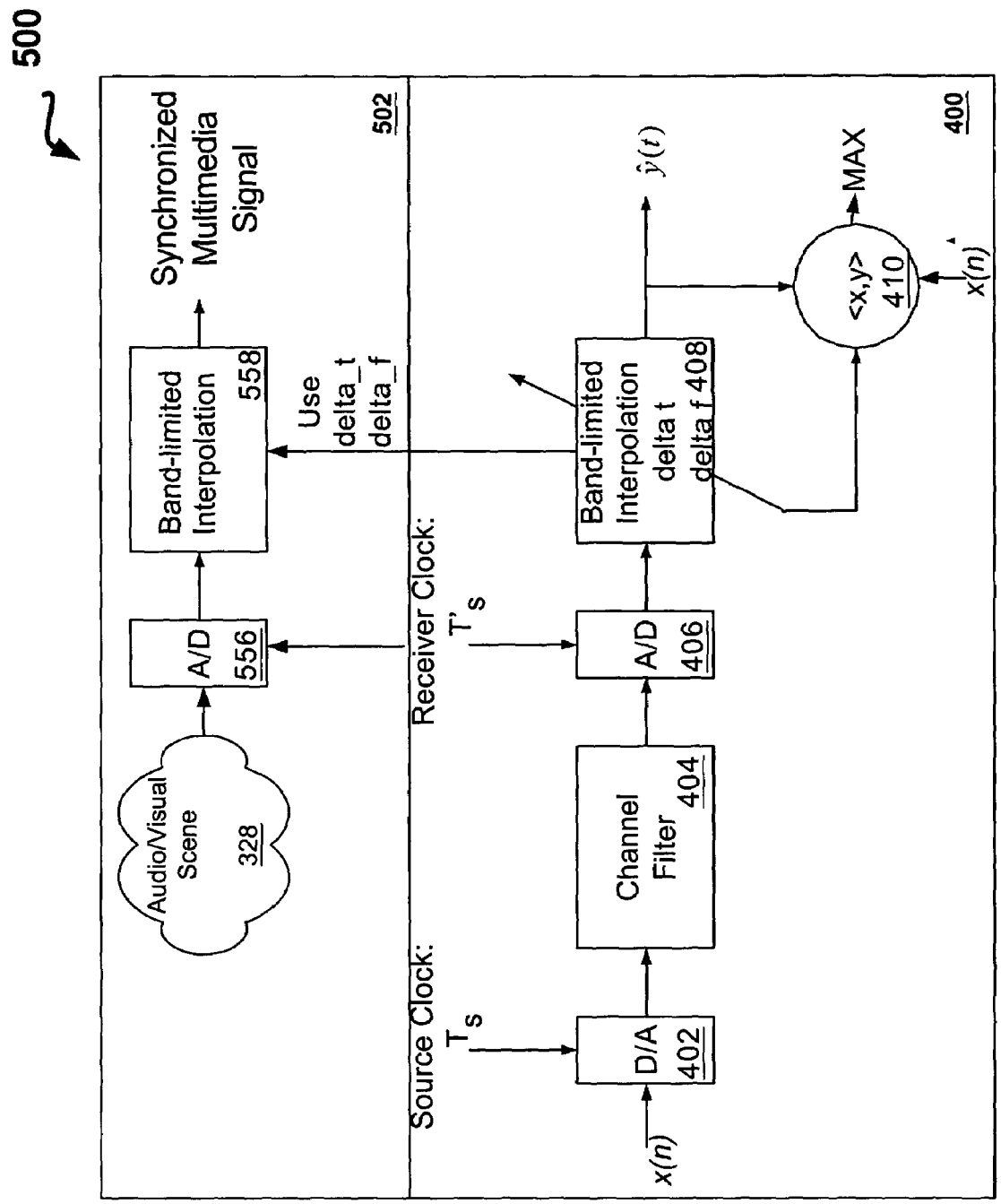
FIG. 5 illustrates an exemplary adaptive filtering system 500 in accordance with an embodiment of the present invention.

FIG. 5 illustrates an exemplary adaptive filtering system 500 in accordance with an embodiment of the present invention. In one embodiment of the present invention, the system 500 includes the system 400 of FIG. 4A. The system 500 also includes a portion 502 to provide synchronized multimedia signals for additional channels. For example, additional audio/visual scene signals may be collected (by, for example, the multimedia platforms 302 and 304 of FIG. 3) from the audio/visual scene 328 such as discussed with reference to FIG. 3 in one embodiment of the present invention.

As illustrated in FIG. 5, the captured signals may then be provided to one or more A/D converters 556 (e.g., one for each channel), which may also receive the receiver clock ($T_s'$). The A/D converter 556 may be coupled to a respective band-limited interpolation module (558). The band-limited 558 may receive the estimated delta_t and delta_f values from the band-limited interpolation module 408, for example, to avoid having to recalculate these values. Accordingly, in accordance with an embodiment of the present invention, a single clock may drive multiple channels.

In one embodiment of the present invention, even though one additional channel per device may be assigned to perform synchronization (such as discussed with reference to FIG. 5), it is envisioned that the analog synchronization signal at the receiver can be mixed into the analog data channel at the receiver before the A/D conversion, provided the magnitude of the signal is maintained small enough to introduce no perceived distortion. Such an embodiment of the present invention is illustrated in FIG. 6.

Figure 6:
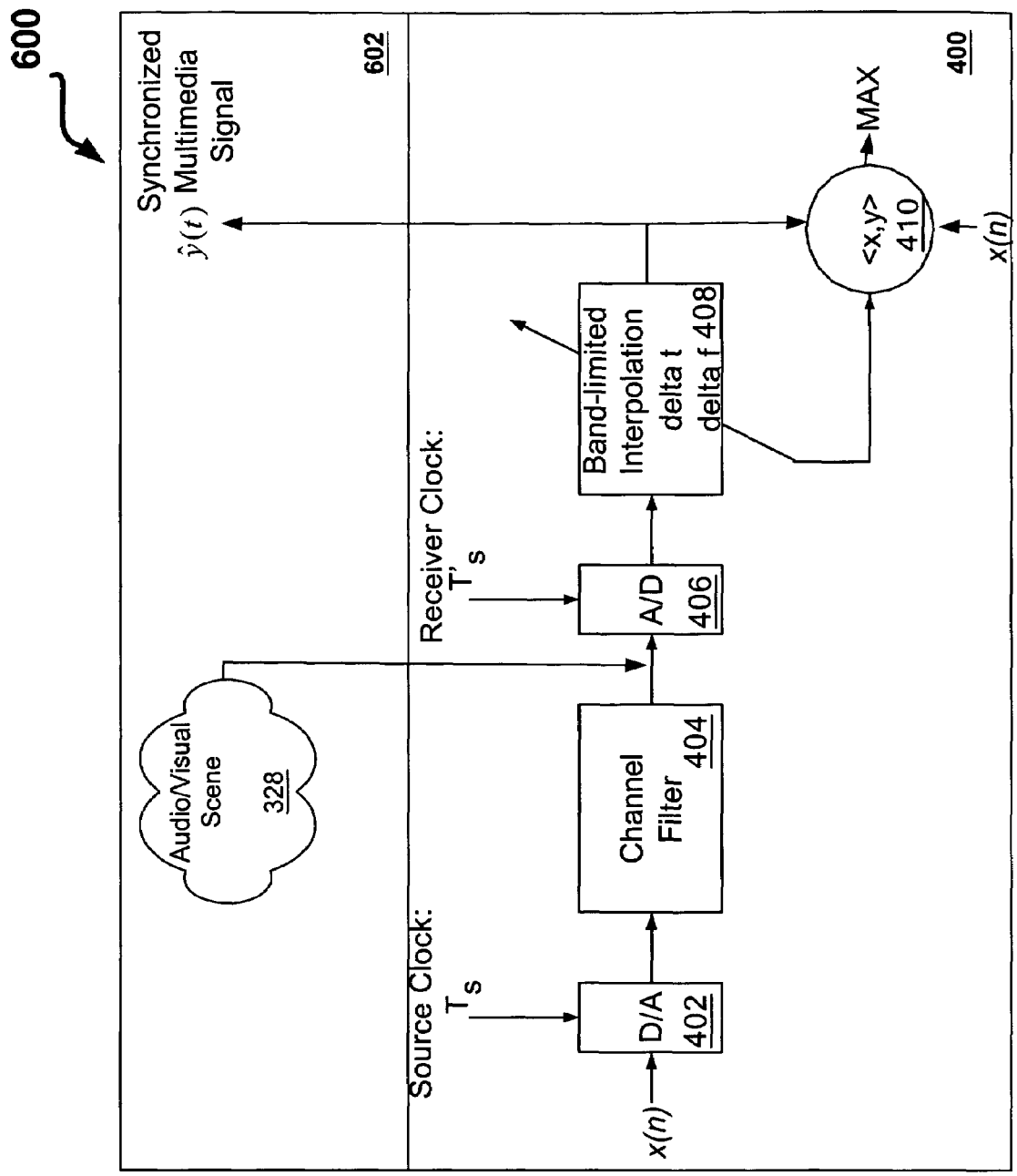
FIG. 6 illustrates an exemplary adaptive filtering system 600 in accordance with an embodiment of the present invention.

FIG. 6 illustrates an exemplary adaptive filtering system 600 in accordance with an embodiment of the present invention. In one embodiment of the present invention, the system 600 includes the system 400 of FIG. 4A. The system 600 also includes a portion 602 to provide synchronized multimedia signals for additional channels. For example, the analog synchronization signal may be mixed into the additional captured audio/visual scene signals from the audio/visual scene 328 (e.g., at the A/D converter 406). In turn, the output of the band-limited interpolation module 408 may provide synchronization for additional multimedia channels.

In accordance with an embodiment of the present invention, it is envisioned that the MLS-based synchronization indicates that the autocorrelation peaks are detected reliably even when the magnitude of the MLS signal is up to two orders below the magnitude of the audio signal for a length 1023 sequence (for longer MLS sequences this magnitude can be made even smaller).

Whereas many alterations and modifications of the present invention will no doubt become apparent to a person of ordinary skill in the art after having read the foregoing description, it is to be understood that any particular embodiment shown and described by way of illustration is in no way intended to be considered limiting. For example, even though embodiments of the present invention have been discussed with respect to a band-limited interpolation module, it is envisioned that other interpolation techniques may be utilized. Therefore, references to details of various embodiments are not intended to limit the scope of the claims which in themselves recite only those features regarded as essential to the invention.

What is claimed is:

1. An apparatus comprising:
    a first multimedia signal channel to sample a first multimedia signal, the first multimedia signal channel also having an analog to digital converter to receive a predefined synchronization signal and a receiver clock, and an interpolation module coupled to the analog to digital converter to receive an output of the analog to digital converter and to continuously estimate and adapt current delay and skew estimates to synchronize the first multimedia signal; and
    a second multimedia signal channel to sample a second multimedia signal synchronized with the first multimedia signal using the delay and skew estimates from the first multimedia signal channel.

2. The apparatus of claim 1 further including a digital to analog converter coupled to the analog to digital converter to receive the synchronization signal and a source clock and to provide its output to the analog to digital converter.

3. The apparatus of claim 1 wherein the apparatus is utilized to synchronize a plurality of multimedia signals captured by a plurality of devices.

4. The apparatus of claim 1 wherein the synchronization signal is embedded in another signal.

5. The apparatus of claim wherein the first and second multimedia signal includes data selected from one or more items including an audio signal and a video signal.

6. The apparatus of claim 1 wherein the apparatus is embedded in a device selected from a group comprising a digital signal processor (DSP), a coder-decoder (codec) module, and a CPU.

7. The apparatus of claim 2 wherein the source clock is provided by a device selected from a group comprising a DSP, a codec module, and a CPU.

8. The apparatus of claim 1 further including a channel filter coupled to the analog to digital converter, the channel filter characterizing a signal transmission environment coupling a sender of the synchronization signal and a receiver of the synchronization signal.

9. The apparatus of claim 8 wherein the transmission environment is selected from a group comprising a wired medium and a wireless medium.

10. The apparatus of claim 1 wherein the interpolator is initialized by rough estimates for the time delay and sampling skew factor.

11. The apparatus of claim 10 wherein the initialization is based on autonomous estimation of skew.

12. The apparatus of claim 1 wherein the apparatus utilizes MLS to synchronize the signal.

13. The apparatus of claim 12 wherein at least two or more audio samples per MLS symbol are utilized to improve a precision of finding a position of an autocorrelation peak.

14. The apparatus of claim 12 wherein to find the position, a curve is fitted corresponding to an autocorrelation main lobe to the audio samples with highest values.

15. The apparatus of claim 1 wherein a networking service is utilized to calibrate the receiver clock.

16. The apparatus of claim 15 wherein the calibrating is performed through running a audio capture process to count a number of samples observed per measurement period.

17. The apparatus of claim 15 wherein the networking service is Network Time Protocol (NTP).

18. The apparatus of claim 17 wherein the NTP has a clock error per day (CEPD) of about hundreds of milliseconds.

19. The apparatus of claim 1 wherein the interpolation module is band-limited.

20. A method comprising:
    receiving a predefined synchronization signal and a receiver clock in a first multimedia signal channel;
    convening the received synchronization signal and receiver clock from analog to digital;
    continuously estimating and adapting current delay and skew estimates based on the converted digital signals;

applying the delay and skew estimates to sample a first multimedia signal in the first multimedia signal channel; and applying the delay and skew estimates to sample a second multimedia signal in a second multimedia channel so that the first and second multimedia signals are synchronized.

21. The method of claim 20 wherein converting from analog to digitalis performed by an analog to digital converter and wherein the received synchronization signal and receiver clock are digital, the method further including converting the received synchronization signal and receiver clock to analog at a digital to analog converter and providing its output to the analog to digital converter.

22. The method of claim 20 wherein the first and second multimedia signals are collected from a plurality of different sources.

23. The method of claim 20 wherein the signal includes data selected from one or more items including an audio signal and a video signal.

24. The method of claim 20 further including characterizing a signal transmission environment coupling a sender and a receiver using a channel filter.

25. The method of claim 20 wherein the transmission environment is selected from a group comprising a wired medium and a wireless medium.

26. The method of claim 20 wherein continuously estimating and adapting P band-limited in an interpolation module.

27. An article of manufacture comprising:
a machine readable medium that provides instructions that, if executed by a machine, will cause the machine to perform operations including:
receiving a predefined synchronization signal and a receiver clock in a first multimedia signal channel;
converting the received synchronization signal and receiver clock from analog to digital;
continuously estimating and adapting current delay and skew estimates based on the converted digital signals;
applying the delay and skew estimates to sample a first multimedia signal in the first multimedia signal channel; and
applying the delay and skew estimates to sample a second multimedia signal in a second multimedia channel so that the first and second multimedia signals are synchronized.

28. The article of claim 27 wherein the first and second multimedia signals are collected from a plurality of different sources.

29. A computer system comprising:
a central processing unit (CPU);
a display device coupled to the CPU to display an image;
a memory coupled to the display device to store the image;
a first multimedia signal channel to sample a first multimedia signal, the first multimedia signal channel also having an analog to digital converter to receive a predefined synchronization signal and a receiver lock and, and an interpolation module coupled to the analog to digital converter to receive an output of the analog to digital converter and to continuously estimate and adapt current delay and skew estimates to synchronize the first multimedia signal; and
a second multimedia signal channel to sample a second multimedia signal synchronized with the first multimedia signal using the delay and skew estimates from the first multimedia signal channel.

30. The computer system of claim 29 wherein the display device is selected from a group comprising an LCD, a flat panel display, a plasma screen, and a TFT display.

* * * * *

UNITED STATES PATENT AND TRADEMARK OFFICE
CERTIFICATE OF CORRECTION

| | | |
|---|---|---|
| PATENT NO. | : 7,702,941 B2 | Page 1 of 1 |
| APPLICATION NO. | : 10/640108 | |
| DATED | : April 20, 2010 | |
| INVENTOR(S) | : Lienhart et al. | |

It is certified that error appears in the above-identified patent and that said Letters Patent is hereby corrected as shown below:

In column 11, at line 9 delete, "digitalis" and insert --digital is--.

In column 11, at line 29 delete, "P" and insert --is--.

In column 12, at line 22 delete, "lock" and insert --clock--.

Signed and Sealed this
Twenty-ninth Day of March, 2011

David J. Kappos
*Director of the United States Patent and Trademark Office*